United States Patent [19]
McNeely et al.

[11] Patent Number: 5,250,333
[45] Date of Patent: Oct. 5, 1993

[54] MODIFIED POLYETHYLENE TEREPHTHALATE

[75] Inventors: Gerald W. McNeely; Aylmer J. Woodward, both of Spartanburg, S.C.

[73] Assignee: Hoechst Celanese Corporation, Somerville, N.J.

[21] Appl. No.: 965,634

[22] Filed: Oct. 26, 1992

[51] Int. Cl.$^5$ ................................. B65D 1/00
[52] U.S. Cl. .................... 428/35.7; 528/272; 528/297; 528/298; 528/300; 528/302; 528/308; 528/308.6; 525/437; 525/449; 428/34.1
[58] Field of Search ............... 528/272, 297, 298, 300, 528/302, 308, 308.6; 525/437, 449; 428/34.1, 35.7

[56] References Cited

U.S. PATENT DOCUMENTS

| | | | |
|---|---|---|---|
| 4,069,278 | 1/1978 | Borman et al. | 525/444 |
| 4,132,707 | 1/1979 | Borman | 528/273 |
| 4,147,738 | 4/1979 | Borman | 525/439 |
| 4,161,579 | 7/1979 | Edelman et al. | 525/444 |
| 4,379,913 | 4/1983 | Waitkus | 528/300 |
| 4,644,019 | 2/1987 | McDaniel | 521/173 |
| 5,006,613 | 4/1991 | Shepherd et al. | 525/444 |

*Primary Examiner*—Samuel A. Acquah
*Attorney, Agent, or Firm*—G. N. Clements

[57] ABSTRACT

A modified polyethylene terephthalate is provided. Modification is provided by the incorporation of an alkoxylated polyol. The modified PET is melt-strength enhanced and extrusion blow-moldable. The modified PET may contain units derived from 2,6-naphthalenedicarboxylic acid, and be useful for making bottles or containers having hot fill applications. Reduced yellowness is advantageously provided.

13 Claims, No Drawings

MODIFIED POLYETHYLENE TEREPHTHALATE

FIELD OF THE INVENTION

This invention relates to polyethylene terephthalate polyester.

BACKGROUND OF THE INVENTION

Polyethylene terephthalate (PET) polyester is commonly prepared by the reaction of ethylene glycol with a terephthalate ester such as dimethyl terephthalate, or less often, with terephthalic acid. This polyester has found wide acceptance in the packaging of food products, in the form of films, sheets and containers.

Blow molding is used to make hollow shaped thermoplastic articles such as containers or bottles for carbonated beverages and the like. In extrusion blow molding, a parison is vertically extruded and thereafter inflated to cause the walls of the parison to assume the shape of a mold. In injection blow molding, a thermoplastic resin is injection molded around a core pin to form a preform and then transferred to a blow mold.

Extrusion blow molding in particular, requires a resin with high melt strength, typically demonstrated by hang time, and with viscoelasticity. However, conventional PET has poor melt strength and tends to drool during extrusion blow molding. Accordingly, there is large commercial demand for a high melt strength PET.

As illustrated by U.S. Pat. No. 4,161,579 to Edelman et al and U.S. Pat. No. 4,609,721 to Kirshenbaum et al, a high melt strength PET polymer modified by the incorporation of a polyfunctional alcohol or acid, chain branching agent is known. The PET polymer may contain a minor amount of diacid co-monomers such as isophthalic acid, adipic acid, 2,6-naphthalenedicarboxylic acid and p-hydroxybenzoic acid. Exemplary chain branching agents include glycerol, sorbitol, hexane triol-1,2,6, pentaerythritol, trimethylolethane, trimethylolpropane, trimethylol benzene-1,3,5, trimesic acid and trimellitic acid.

As exemplified by U.S. Pat. Nos. 4,069,278, 4,132,707 and 4,147,738 to Borman, a branching component containing at least three ester-forming groups, may be incorporated into or blended with a polyalkylene terephthalate prior to processing steps for providing high melt viscosity, thermoplastic block co-polyesters. Illustrative branching components include tri- and tetracarboxylic acids and lower alkyl esters thereof, polyols, dihydroxycarboxylic acids, and hydroxydicarboxylic acids and derivatives such as dimethyl hydroxyterephthalate.

U.S. Pat. No. 4,554,328 to Sinker et al describes a PET polymer suitable for extrusion blow molding. Particularly described is a PET polymer made from 96 parts by weight dimethylterephthalate, 4 parts by weight dimethylisophthalate, and 0.3 parts by weight pentaenythritol, in the presence of an end capping agent. U.S. Pat. No. 4,340,721 to Bonnebat et al describes a PET polyester including 1.5 to 7.5 mol % of recurring units of a crystallization retardant which may be a polyhydric alcohol or a polybasic carboxylic acid such as isophthalic acid or naphthalenedicarboxylic acid, for reducing the residual acetaldehyde concentration. Despite prior work directed to polyethylene terephthalates having high melt strength and reduced acetaldehyde content, the search continues for an improved PET particularly having enhanced melt strength.

There is also a strong commercial demand for a PET resin useful for producing containers or bottles that can be hot-filled between about 85° and 120° C. Normal PET containers can be filled at approximately 80°C. At higher temperatures, these containers usually shrink and/or distort. Advantageously, polyethylene 2,6-naphthalene dicarboxylate (PEN) polyester may be used for such an application due to its higher glass transition temperature. However, PEN is a higher cost material than PET.

To meet the market need for hot fill food and beverage containers at a lower cost, blends of PET and PEN have been produced. U.S. Pat. No. 5,006,613 to Shepherd et al exemplifies a blend preferably containing about 35 to 60 wt. % PET, about 30 to 60 wt. % PEN, and a compatibilizing copolyester for providing clarity. The PET and PEN polyesters may each include up to 15 mol % of a modifying dicarboxylic acid such as isophthalic acid, adipic acid, glutaric acid and so forth.

Containers or bottles formed from a PET/PEN blend or from a copolymer of ethylene terephthalate and ethylene 2,6-naphthalene dicarboxylate, are superior to PET in hot fill applications due to an increased glass transition temperature, and as a result, container shrinkage and distortion are reduced. However, a container characterized by undesired yellowness is aesthetically unpleasing and continues to be a problem associated with processing certain polyesters into bottles or containers.

Therefore, there continues to be a need for a melt strength-enhanced PET having improved hang time and that is useful for blow molding, in particular for extrusion blow molding of bottles or containers. Moreover, there is a continued need for a PET resin useful for hot fill applications.

SUMMARY OF THE INVENTION

In accordance with the present invention, polyethylene terephthalate modified by the incorporation of a small amount of an alkoxylated polyol is provided. Beneficially, the alkoxylated polyol is formed from a polyol having at least three primary hydroxyl groups. The modified polyethylene terephthalate may contain 2,6-napthalenedicarboxylic acid and be useful for hot fill applications. Also provided is a container made from the modified polyethylene terephthalate.

DETAILED DESCRIPTION OF THE INVENTION

As indicated above, the present invention is directed in one aspect, to a modified polyethylene terephthalate resin having improved hang time. As a consequence, the present invention provides a melt strength-enhanced, polyethylene terephthalate resin useful for blow molding. More particularly, a beverage bottle-grade, modified PET resin that may be processed by extrusion blow molding, is provided.

In another aspect, the present invention is directed to a modified polyethylene terephthalate resin especially useful for hot fill applications and having decreased yellowness, further modified with ethylene 2,6-naphthalene dicarboxylate or blended with polyethylene 2,6-naphthalene dicarboxylate. Yellowness is aesthetically unappealing and may be an indication of degradation and resultant property loss. As a result, the present invention may provide a polyethylene terephthalate resin of reduced degradation. Furthermore, the decreased yellowness may advantageously provide resin processors with a wider temperature processing window and thus increased processing flexibility. Generally speaking, a modified polyethylene terephthalate resin in accordance with the present invention will have a yellowness value less than about 1.5.

The terms "polyethylene terephthalate" and "PET" as used herein are used generally to include polymers made by condensing ethylene glycol with terephthalic acid or dimethyl terephthalate, no matter how prepared. Furthermore, these terms are meant to include well-known polyethylene terephthalate polymers which are modified by the inclusion of minor amounts, e.g., less than about 25 percent by weight of the polymer, of co-monomers or modifying agents, as is otherwise well known. Such co-monomers or modifying agents include various diols such as 1,4-butanediol, cyclohexanedimethanol, diethylene glycol and 1,3-propanediol. Likewise, such co-monomers or modifying agents may include various diacids such as isophthalic acid and naphthalene dicarboxylic acid. Chain terminating agents may also be used.

Accordingly, a PET in accordance with the present invention, which is modified as hereinafter described, may be a PET homopolymer or a copolymer containing PET in a major amount. Typically, a PET copolymer will include from about 75 to 97 wt. % of recurring units of terephthalic acid, based upon the total acid units.

A PET copolymer modified as hereinafter described, may include at least one co-monomeric diacid, typically an aliphatic or aromatic dicarboxylic acid, in an amount of from about 0.1 to 30 wt. % of the total acid units. Examples include isophthalic acid, which may be used in an amount of typically about 0.1 to 5 wt. %, and for hot fill applications, generally about 5 to 30 wt. % of 2,6-naphthalenedicarboxylic acid, based upon total acid units. Although more than about 25 wt. % of 2,6-naphthalenedicarboxylic acid may be used for hot fill applications, cost considerations may dictate otherwise.

Beneficially, in accordance with the present invention, polyethylene terephthalate is modified by the incorporation of an alkoxylated, for example an ethoxylated, polyol. Advantageously, the alkoxylated polyol is formed from a polyol having at least three primary hydroxyl groups, typically three or four primary hydroxyl groups. The polyol may be of the formula

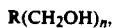
R(CH$_2$OH)$_n$, wherein R is a saturated aliphatic hydrocarbon radical containing from 1 to 6 carbon atoms, or a phenyl moiety, and wherein n is 3 or 4. A preferable aliphatic-based polyol has the formula

R$_2$-C(CH$_2$OH)$_m$, wherein R$_2$ is an alkyl group of from 1 to 6 carbon atoms such as methyl or ethyl, or is a hydroxymethylene moiety, and wherein m is 3.

Examples of useful alkoxylated polyols include alkoxylated triols and tetrols such as alkoxylated trimethylolethane, alkoxylated trimethylolpropane and alkoxylated pentaerythritol. Useful alkoxylated polyols also include the alkoxylated dimer of pentaerythritol.

Typically, the average number of alkoxy moieties per polyol will be in the range of about 3 to 20, and may be for instance, 3, 10, 12 or 16. Alkoxylation is measured by an average number for the reason that some alkoxylated polyols in a batch will have a lesser degree of alkoxylation while other polyols in the batch will have a greater degree of alkoxylation.

Specific examples of alkoxylated polyols are ethoxylated trimethylolethane, ethoxylated trimethylolpropane and ethoxylated pentaerythritol. By comparison, an alkoxylated polyol prepared from glycerol, a polyol having two primary hydroxyl groups, has been found not to be suitable.

Even though trimethylolpropane has only three primary hydroxyl groups available for alkoxylation, an ethoxylated trimethylolpropane may be prepared having an average of, for instance, 3 or 20 ethoxy groups per trimethylolpropane molecule. Thus, alkoxylated polyols useful in the present invention may be envisioned as having single alkoxy group-containing chains or multiple alkoxy group-containing chains.

The amount of the alkoxylated polyol additive to be used will, of course, depend upon the particular alkoxylated polyol selected, taking into account the average number of alkoxy moieties per polyol molecule, the particular PET to be produced, the advantage desired, and the intended processing application of the modified PET. Thus, for instance, a relatively decreased amount of an alkoxylated polyol prepared from a polyol having relatively more primary hydroxyl groups, may be sufficient when compared to the amount required for an alkoxylated polyol prepared from a polyol having relatively fewer primary hydroxyl groups.

Generally, a small amount of the alkoxylated polyol additive will be suitable. While the additive may be used in an amount of 2% or more, even up to about 5%, based upon the total acid units, competing considerations in preparing a modified polyethylene terephthalate in accordance with the present invention, such as clarity of a blow molded container or bottle, come into play. It is desired that the clarity exceed that of a polypropylene or polyethylene bottle. Moreover, cost considerations for a level of the additive above about 1%, may also dictate a lower level of the additive.

When making a modified polyethylene terephthalate intended for processing by extrusion blow molding, about 5000 ppm of an alkoxylated polyol such as ethoxylated trimethylolpropane having an average of three moles of ethoxylation per molecule of trimethylolpropane, is typically a very suitable level of the additive. When making a modified polyethylene terephthalate including ethylene 2,6-naphthalene dicarboxylate and intended for hot fill applications, about 100 to 1200 ppm, for example, 800 ppm, of the additive may generally suffice to provide reduced yellowness in accordance with the present invention.

For hot fill applications, as illustrated by U.S. Pat. No. 5,006,613 to Shepherd et al, a blend of a PET polymer with a PEN polymer may also be used. Polymer modification by incorporation of an alkoxylated polyol, may beneficially reduce yellowness in the blend.

As known to those skilled in the art, a PET polyester is generally made in two stages. In the first stage, known as the transesterification or ester interchange stage, a dicarboxylic acid dimethyl ester is typically reacted with ethylene glycol at an elevated temperature, and methanol is removed. In the second or polycondensation stage, a stabilizer is added and the pressure is gradually reduced while the temperature is increased, and water along with excess ethylene glycol are withdrawn. Suitably, in making a modified PET in accordance with the present invention, the ethoxylated polyol is added at the beginning of the ester interchange stage.

As an ester interchange-promoting catalyst, manganese in the form of manganese diacetate, may be beneficially used. Antimony trioxide may be used as a polycondensation-promoting catalyst, and a phosphorus-containing stabilizer may be used to neutralize the manganese catalyst during the polycondensation stage.

A modified PET thus produced in accordance with the present invention, will have a yellowness value of generally less than about 1.5, and for a modified PET containing even as much as 10 wt. % of 2,6-naphthalene-dicarboxylic acid, may have a yellowness value of −12.5, thereby providing for increased processing flexibility by the resin processor. Yellowness values are not absolutes but even for the same reaction mix can vary depending upon factors including the batch size and the type of reaction vessel.

To obtain a modified PET having a desired, increased SV, the amorphous modified polyester formed by the polycondensation stage (precursor polyester) may be subjected to solid state polymerization. In this step, the precursor polyester may be provided in the form of chips, and chip surfaces crystallized at an elevated temperature and under reduced pressure.

A solid state polymerized, modified PET produced in accordance with the present invention, beneficially will have enhanced melt strength as indicated by improved hang time. A suitable melt strength is proven by the formation of a sag resistant, stable parison. Furthermore, as indicated, containers or bottles made from the modified PET including generally at least about 5 wt. % 2,6-naphthalenedicarboxylic acid, may be hot filled.

After solid state polymerization, a modified PET polyester in accordance with the present invention may be molded by a wide variety of processes to form containers, packages and bottles. The modified PET may be blow molded, and in particular may be extrusion blow molded. Food or beverage containers, sterilizable containers, containers useful for hot fill applications, and convection oven-heatable, frozen food trays may be formed. Containers for industrial chemicals, household chemicals, automotive chemicals and motor oil may also be manufactured from the modified resin.

In the examples that follow and throughout this description, all parts and percentages are weight percent, unless otherwise specified.

EXAMPLE 1

Add dimethyl terephthalate (5.15 moles), an excess of ethylene glycol, ethoxylated trimethylolpropane having an average of 3 moles ethoxylation per mole of trimethylolpropane (2%, based on the amount of DMT), and a catalyst mixture (manganese diacetate, 91 ppm Mn; antimony trioxide, 309 ppm Sb) to a reaction vessel. Heat is applied to begin the ester interchange stage. Methanol by-product is removed, and when the reaction temperature has increased to about 250° C., the ester interchange is complete.

Thereafter, isophthalic acid (2.5%, based on DMT) is added as a slurry in glycol, and glycol is removed. To begin the polycondensation stage, a phosphorus-containing stabilizer in the form of polyphosphoric acid (70 ppm P) is added to the ester interchange product, and the pressure is gradually further reduced as the temperature is increased to about 290° C. When the polycondensation stage is complete, a modified PET in accordance with the present invention, is obtained.

The modified PET is subjected to solid state polymerization, and is thereafter evaluated for hang time using a modification of ASTM D3835-79, in which an extruder having a 1 cm diameter extrusion orifice is vertically oriented, and the time for a molten rod-shaped extrudate to free fall a distance of 10″ is measured. Thereafter, the SV of the extrudate is conventionally measured. The results are set forth in Table 1. If desired, the hang time may be further enhanced by increasing polymer molecular weight by additional solid state polymerization.

EXAMPLE 2

The procedure of Example 1 is repeated using the levels of modifiers indicated in Table 1 (the catalyst mixture further includes cobalt diacetate, 54 ppm Co), and the modified PET is evaluated for hang time and extruded SV. The results are shown in the Table.

EXAMPLE 3

Add dimethyl terephthalate (2.78 moles), an excess of ethylene glycol, dimethyl 2,6-naphthalenedicarboxylate (0.25 moles), ethoxylated trimethylolpropane

TABLE 1

| Example | Modifier | Hang Time (sec.) | Extruded SV |
|---------|----------|------------------|-------------|
| #1 | 2% ETMP3 2.5% IPA | 10.7 | 891 |
| #2 | 0.5% ETMP3 2.5% IPA | 11.5 | 933 |

TABLE 2

| Example | Additive | Yell | Comp. Example | Additive | Yell |
|---------|----------|------|---------------|----------|------|
| #3 | ETMP3 | −11.5 | #1 | — | 5.5 |
| #4 | ETMP3 | −12.1 | #2 | — | 4.8 |
| #5 | ETMP10 | −9.6 | #3 | penta | 2.8 |
| #6 | ETMP10 | −9.1 | #4 | penta | 6.0 |
| #7 | ETMP12 | −10.0 | | | |
| #8 | ETMP12 | −11.7 | | | |
| #9 | ETMP16 | −9.4 | | | |
| #10 | ETMP16 | −8.8 | | | |

ETMP is an ethoxylated trimethylolpropane; 3 indicates the trimethylolpropane has been ethoxylated with an average of 3 moles of ethylene oxide, 10 indicates ethoxylation with an average of 10 moles of ethylene oxide, and so forth.
penta is pentaerythritol having an average of 3 moles ethoxylation per mole of trimethylolpropane (800 ppm), and a catalyst mixture (manganese diacetate, 90 ppm Mn; antimony trioxide, 350 ppm Sb; and cobalt diacetate, 90 ppm Co) to a reaction vessel. Heat is applied to begin the ester interchange stage. Methanol by-product is removed, and when the reaction temperature has increased to about 250° C., the ester interchange is complete.

Thereafter, to begin the polycondensation stage, a phosphorus-container stabilizer (polyphosphoric acid, 100 ppm P) is added to the ester interchange product, and the pressure is gradually further reduced as the temperature is increased to about 290° C. When the polycondensation stage is complete, a modified PET derived from 90 wt. % terephthalic acid and 10 wt. % 2,6-naphthalenedicarboxylic acid, is obtained. The modified PET is evaluated for yellowness. The results are set forth in Table 2.

EXAMPLES 4-10

The procedure of Example 3 is repeated using the ethoxylated trimethylolpropane indicated in Table 2, and the modified PET is evaluated for yellowness. The results are shown in the Table.

COMPARATIVE EXAMPLES 1-4

The procedure of Example 3 is repeated using the additive indicated in Table 2, and the PET is evaluated for yellowness. The results are set forth in the Table.

The present invention may be carried out with various modifications without departing from the spirit or essential attributes thereof, and accordingly, reference should be made to the appended claims, rather than to the foregoing specification as indicating the scope of the invention.

We claim:

1. Polyethylene terephthalate modified by the incorporation of a small amount of an alkoxylated polyol prepared from a polyol having at least three primary hydroxyl groups.

2. The polyethylene terephthalate of claim 1, comprising about 0.1 to 30 wt. %, based upon the total acid units, of at least one co-monomeric diacid.

3. The polyethylene terephthalate of claim 1, wherein said at least one co-monomeric diacid is an aromatic dicarboxylic acid.

4. The polyethylene terephthalate of claim 1, comprising about 5 to 30 wt. %, based upon the total acid units, of 2,6-naphthalenedicarboxylic acid.

5. The polyethylene terephthalate of claim 1, comprising about 0.1 to 5 wt. %, based upon the total acid units, of isophthalic acid.

6. The polyethylene terephthalate of claim 1, wherein said polyol has three or four primary hydroxyl groups.

7. The polyethylene terephthalate of claim 1, wherein said polyol is of the formula $$R(CH_2OH)_n,$$

wherein R is a saturated aliphatic hydrocarbon radical containing from 1 to 6 carbon atoms, or a phenyl moiety, and wherein n is 3 or 4.

8. The polyethylene terephthalate of claim 1, wherein said polyol is of the formula $$R^2\text{-}C(CH_2OH)_m,$$

wherein $R_2$ is an alkyl group of from 1 to 6 carbon atoms such as methyl or ethyl, or is a hydroxymethylene moiety, and wherein m is 3.

9. The polyethylene terephthalate of claim 1, wherein said alkoxylated polyol is ethoxylated trimethylolpropane.

10. The polyethylene terephthalate of claim 1, wherein said alkoxylated polyol has an average number of alkoxy moieties per polyol in the range of about 3 to 20.

11. The polyethylene terephthalate of claim 1, wherein said amount of alkoxylated polyol ranges from about 100 ppm to 50,000 ppm.

12. A container made from the modified polyethylene terephthalate of claim 1.

13. A container made from the modified polyethylene terephthalate of claim 4.

* * * * *